United States Patent
Jung et al.

(10) Patent No.: US 10,465,580 B2
(45) Date of Patent: Nov. 5, 2019

(54) EXHAUST SYSTEM AND CONTROL METHOD OF NITROGEN OXIDE DESORPTION

(71) Applicant: Hyundai Motor Company, Seoul (KR)

(72) Inventors: ChangHo Jung, Osan-si (KR); Pyung Soon Kim, Suwon-si (KR)

(73) Assignee: Hyundai Motor Company, Seoul (KR)

( * ) Notice: Subject to any disclaimer, the term of this patent is extended or adjusted under 35 U.S.C. 154(b) by 105 days.

(21) Appl. No.: 15/367,049

(22) Filed: Dec. 1, 2016

(65) Prior Publication Data

US 2018/0080357 A1 Mar. 22, 2018

(30) Foreign Application Priority Data

Sep. 20, 2016 (KR) .......................... 10-2016-0120285

(51) Int. Cl.
*F01N 3/08* (2006.01)
*F01N 3/021* (2006.01)
*F01N 3/20* (2006.01)
*F01N 9/00* (2006.01)
(Continued)

(52) U.S. Cl.
CPC ........... *F01N 3/0871* (2013.01); *F01N 3/021* (2013.01); *F01N 3/035* (2013.01); *F01N 3/0814* (2013.01); *F01N 3/0821* (2013.01); *F01N 3/0842* (2013.01); *F01N 3/2066* (2013.01); *F01N 9/00* (2013.01); *F01N 13/009* (2014.06); *F01N 2250/02* (2013.01); *F01N 2330/32* (2013.01); *F01N 2510/0682* (2013.01);
(Continued)

(58) Field of Classification Search
USPC .......... 60/274, 276, 286, 295, 297, 301, 303
See application file for complete search history.

(56) References Cited

U.S. PATENT DOCUMENTS

| 9,016,046 B2 * | 4/2015 | Harmsen .................. F01N 3/10 |
| | | 60/274 |
| 10,040,029 B2 * | 8/2018 | Mital ................. B01D 53/9431 |
| 10,041,391 B2 * | 8/2018 | Jung .................. B01D 53/9422 |

(Continued)

FOREIGN PATENT DOCUMENTS

| JP | 3900421 B2 | 4/2007 |
| JP | 4651039 B2 | 3/2011 |

(Continued)

*Primary Examiner* — Binh Q Tran
(74) *Attorney, Agent, or Firm* — Morgan, Lewis & Bockius LLP

(57) ABSTRACT

An exhaust system may include first purification device disposed at a rear end portion of exhaust manifold and including Lean NOx Trap (LNT); second purification device disposed at rear end portion of the first purification device and including a diesel particulate filter (DPF); and a third purification device disposed at a rear end portion of the second purification device and including a selective catalytic reduction (SCR), wherein the DPF of the second purification device includes at least one inflow channel, at least one outflow channel, at least one wall disposed between the inflow channel and the outflow channel and extended in a longitudinal direction, and a support disposed inside of at least one of the inflow channel and the outflow channel, and at least one catalyst is coated on one of the inner wall of the inflow channel, the inner wall of the outflow channel, and the support.

9 Claims, 6 Drawing Sheets

(51) Int. Cl.
*F01N 3/035* (2006.01)
*F01N 13/00* (2010.01)

(52) U.S. Cl.
CPC ............... *F01N 2900/1602* (2013.01); *F01N 2900/1614* (2013.01); *Y02T 10/24* (2013.01); *Y02T 10/47* (2013.01)

(56) References Cited

U.S. PATENT DOCUMENTS

| | | | |
|---|---|---|---|
| 2007/0110650 A1 | 5/2007 | Pfeifer et al. | |
| 2008/0282670 A1* | 11/2008 | McCarthy, Jr. | F01N 3/0871 60/274 |
| 2010/0236224 A1* | 9/2010 | Kumar | B01D 53/9477 60/297 |
| 2011/0005200 A1* | 1/2011 | Gandhi | B01D 53/8631 60/274 |
| 2016/0290199 A1* | 10/2016 | Park | F01N 3/208 |
| 2017/0051654 A1* | 2/2017 | Gupta | F01N 3/035 |

FOREIGN PATENT DOCUMENTS

| | | |
|---|---|---|
| KR | 10-2013-0003979 A | 1/2013 |
| KR | 10-2015-0059535 A | 6/2015 |
| WO | WO 2005/014146 A1 | 2/2005 |

\* cited by examiner

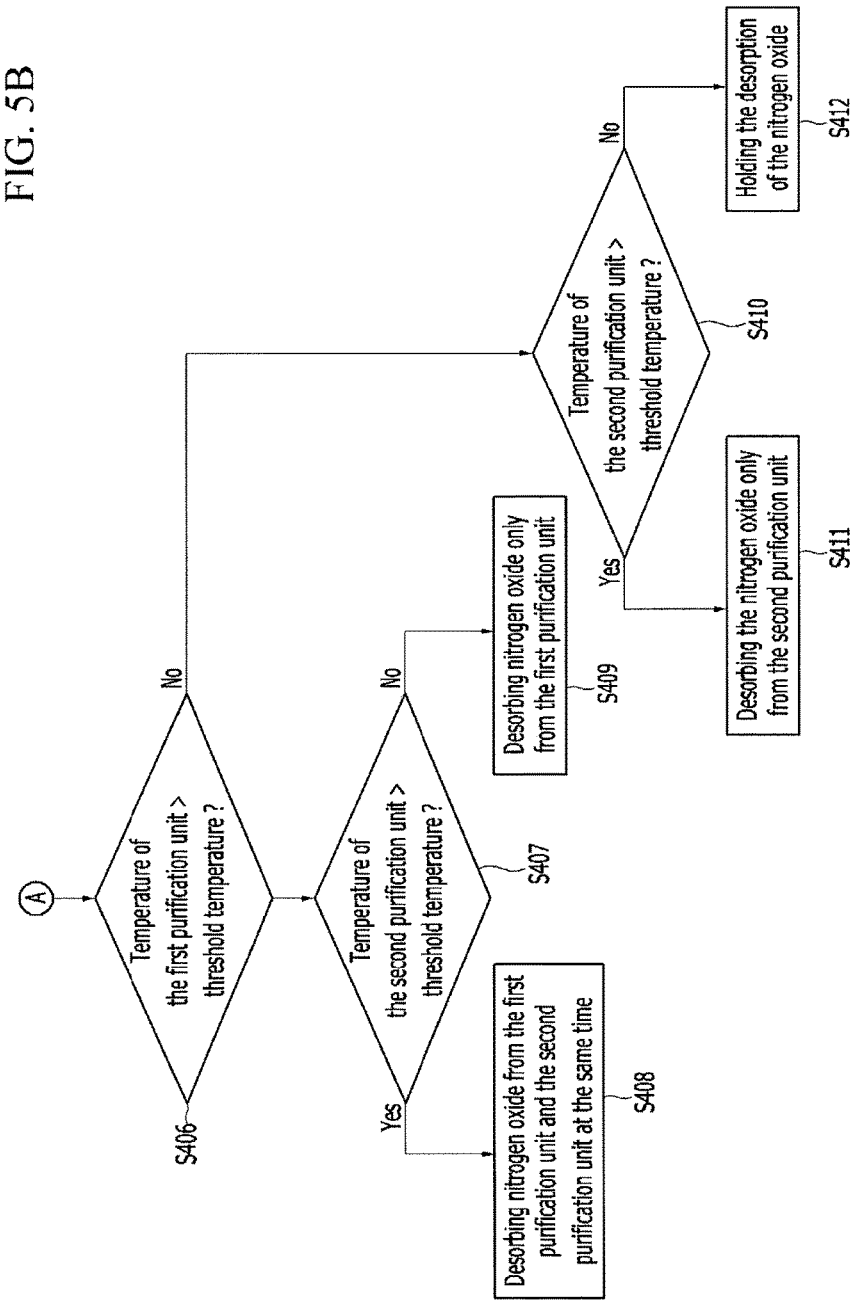

EXHAUST SYSTEM AND CONTROL METHOD OF NITROGEN OXIDE DESORPTION

CROSS-REFERENCE TO RELATED APPLICATION

The present application claims priority to Korean Patent Application No. 10-2016-0120285 filed on Sep. 20, 2016, the entire contents of which is incorporated herein for all purposes by this reference.

BACKGROUND OF THE INVENTION

Field of the Invention

The present invention relates to an exhaust system and control method of nitrogen oxide desorption. More particularly, the present invention relates to an exhaust system and control method of nitrogen oxide desorption including a diesel particulate matter filter simultaneously having function of selective catalytic reduction and nitrogen oxide storage catalyst.

Description of Related Art

In general, to reduce carbon monoxide (CO), hydrocarbon (HC), particulate matter (PM), nitrogen oxide (NOx), etc. as a pollution material contained in an exhaust gas, an exhaust system of an engine includes an exhaust gas post-treatment device such as a diesel oxidation catalyst (DOC) device, a diesel particulate matter filter (DPF), a selective catalytic reduction (SCR) device, and a nitrogen oxide storage catalyst (Lean NOx Trap, LNT catalytic) device, etc.

The LNT catalyst is simple and cheap compared with SCR catalyst, but nitrogen oxide purification efficiency is very low in a high temperature and high load. Accordingly, the LNT catalyst is applied to a small vehicle which nitrogen oxide purification load is low and exhaust temperature is low. Large purification performance of the LNT catalyst is required to respond with the LNT catalyst to real driving emission (RDE) exhaust regulation without SCR catalyst.

Particularly, catalyst temperature is elevated to above 400 degrees in the RDE high speed and high load driving section to position a temperature that nitrogen oxide storage, and a plurality of nitrogen oxide abruptly inflows to catalyst with high flow rate exhaust gas in a high RPM so that the LNT catalyst cannot store nitrogen oxide enough.

Meanwhile, the DPF filters and burns particulate matter (PM), and the DPF has a number of channels in an exhaust gas flow and at least one closed portion at entrance or exit of the channels, or the channels is disposed alternately.

Recently, function that particulate matters are eliminated by coating catalyst on the DPF is enhanced or exhaust gas is additionally eliminated. Purification function may be improved by adding coating amount of catalyst on the DPF or increasing number of channels, but back pressure increases to deteriorate particulate matter filtering efficiency, performance of vehicle, and fuel efficiency.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a DPF improving exhaust purification performance by enhancing catalyst function not diminishing particulate matter filtering efficiency and especially, provides a DPF structure simultaneously having functions of SCR catalyst and LNT catalyst for improving nitrogen oxide purification rate in a high speed and load section.

An exhaust system according to an exemplary embodiment of the present invention includes a first purification device disposed at a rear end portion of exhaust manifold of diesel engine and including a Lean NOx Trap (LNT); a second purification device disposed at a rear end portion of the first purification device and including a diesel particulate filter (DPF); and a third purification device disposed at a rear end portion of the second purification device and including a selective catalytic reduction (SCR), wherein the DPF of the second purification device includes at least one inflow channel in which fluid inflows, at least one outflow channel from which fluid outflows, at least one wall disposed between the inflow channel and the outflow channel and extended in a longitudinal direction, and a support disposed inside of at least one of the inflow channel and the outflow channel, and at least one catalyst is coated on one of the inner wall of the inflow channel, the inner wall of the outflow channel, and the support.

On one of the inner wall of the inflow channel, the inner wall of the outflow channel, and the support, at least one of diesel oxidation catalyst (DOC), the LNT catalyst, or the SCR catalyst may be coated.

The SCR catalyst may be coated on the inner wall of the inflow channel, and the LNT catalyst may be coated on the inner wall of the outflow channel.

The SCR catalyst of the second purification device may be ion substituent zeolite catalyst, especially Cu-CHA catalyst.

The SCR catalyst may be coated on the support.

Amount of platinum (Pt) in the LNT catalyst may be 1.1 to 1.5 times higher than that of the LNT catalyst of the first purification device.

The DPF of the second purification device may have porosity equal to or greater than 55%.

Coating amount of the LNT catalyst and the SCR catalyst of the DPF of the second purification device may be 100 g/L to 200 g/L.

Distance between exit of the first purification device and the entrance of the second purification device may be 550 mm to 600 mm.

The exhaust system according to an exemplary embodiment of the present invention may further include a first lambda sensor disposed between a rear end portion of the exhaust manifold and the first purification device; a second lambda sensor disposed between a first purification device and the second purification device; and a third lambda sensor disposed at a rear end portion of the second purification device.

The exhaust system according to an exemplary embodiment of the present invention may further include a controller synchronizing the first lambda sensor, the second lambda sensor, or the third lambda sensor and controlling regeneration of the LNT catalyst.

Meanwhile, an exhaust system according to another exemplary embodiment of the present invention includes a first purification device disposed at a rear end portion of exhaust manifold of diesel engine and including a first LNT catalyst; a second purification device disposed at a rear end portion of the first purification device and including a second SCR catalyst and a second LNT catalyst disposed at a rear end portion of the second SCR catalyst; and a third purification device disposed at a rear end portion of the second purification device and including a first SCR catalyst.

Meanwhile, a control method of nitrogen oxide desorption according to an exemplary embodiment of the present invention includes measuring a nitrogen oxide loading value of a first purification after ending of nitrogen oxide desorption; measuring of nitrogen oxide slip value of the first purification device; measuring temperature of the first purification device and the second purification device; measuring a nitrogen oxide loading value of the second purification device; comparing the nitrogen oxide loading value of the first purification device with a threshold loading value; comparing the temperature of the first purification device with a threshold temperature in case the nitrogen oxide loading value of the first purification device is greater than the threshold loading value; comparing the temperature of the second purification device with the threshold temperature in case the temperature of the first purification device is greater than the threshold temperature; and desorbing nitrogen oxide from the first purification device and the second purification device at the same time in case the temperature of the second purification device is greater than the threshold temperature.

The control method of nitrogen oxide desorption according to an exemplary embodiment of the present invention may further include desorbing nitrogen oxide only from the first purification device in case the temperature of the second purification temperature is not greater than the threshold temperature.

The control method of nitrogen oxide desorption according to an exemplary embodiment of the present invention may further include comparing the temperature of the second purification device with the threshold temperature in case the temperature of the first purification device is not greater than the threshold temperature; and desorbing the nitrogen oxide only from the second purification device in case the temperature of the second purification device is greater than the threshold temperature.

The control method of nitrogen oxide desorption according to an exemplary embodiment of the present invention may further include holding the desorption of the nitrogen oxide of the first and second purification devices in case the temperature of the second purification device is not greater than the threshold temperature.

According to the exemplary embodiment of the present invention, by the DPF structure having an additional support with conventional wall, catalyst contact time may be increased to increase catalyst response time and increase catalyst coating amount on a filter carrier so that exhaust gas purification performance may be improved.

Also, exhaust gas may not pass through the support, so back pressure increase does not exist, and length of the additional support may be optimized to prevent from catalyst degradation during DPF regeneration.

Also, ammonia disappearing between fore-end LNT catalyst and rear end portion LNT catalyst may be utilized in SCR catalyst by the structure of DPF structure simultaneously having functions of SCR catalyst and LNT catalyst, or by the structure the SCR catalyst and the LNT catalyst are sequentially disposed.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 5A and FIG. 5B are flowcharts illustrating exhaust gas purifying process in the exhaust system according to an exemplary embodiment of the present invention.

Figure 1:
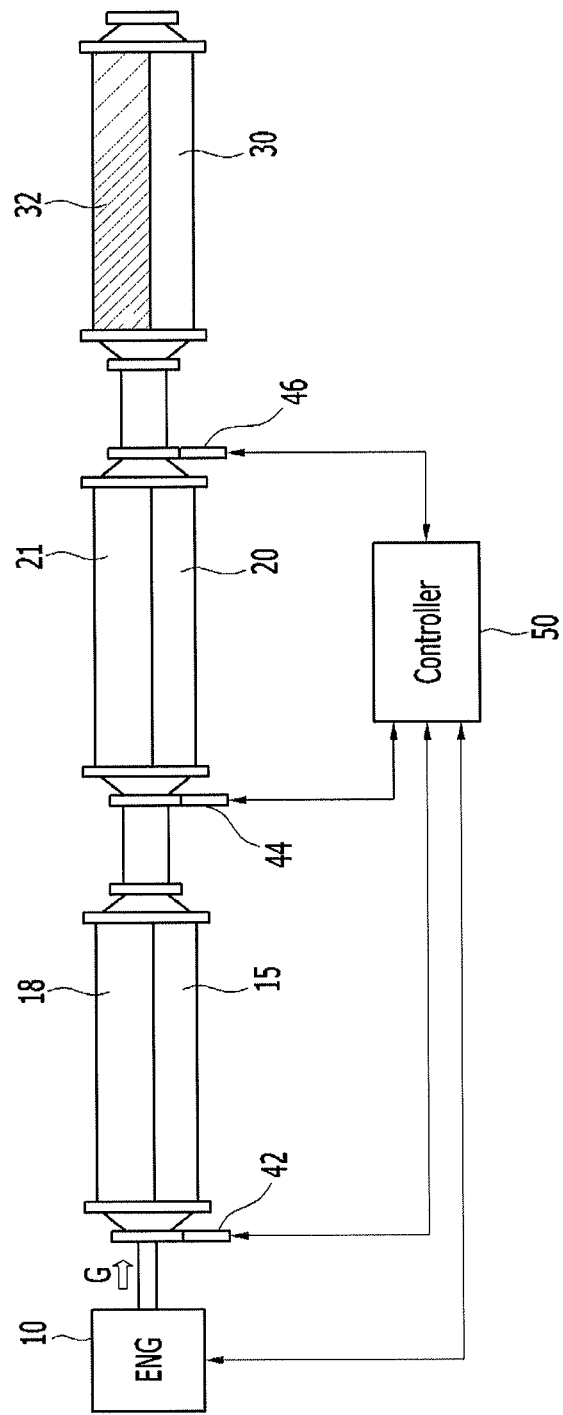
FIG. 1 is a schematic drawing of an exhaust system according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Further, in exemplary embodiments, since like reference numerals designate like elements having the same configuration, a various exemplary embodiments is representatively described, and in other exemplary embodiments, only configurations different from the various exemplary embodiments will be described.

The drawings are schematic, and are not illustrated in accordance with a scale. Relative dimensions and ratios of portions in the drawings are illustrated to be exaggerated or reduced in size for clarity and convenience, and the dimensions are just exemplified and are not limiting. In addition, like structures, elements, or components illustrated in two or more drawings use like reference numerals for showing similar features. It will be understood that when an element including a layer, film, region, or substrate is referred to as being "on" another element, it can be directly on the other element or intervening elements may also be present.

The exemplary embodiment of the present invention shows an exemplary embodiment of the present invention in detail. As a result, various modifications of the drawings will be expected. Therefore, the exemplary embodiment is not limited to a specific aspect of the illustrated region, and for example, includes modifications of an aspect by manufacturing.

Now, an exhaust system according to an exemplary embodiment of the present invention will be described with reference to FIG. 1 to FIG. 3.

FIG. 1 is a schematic drawing of an exhaust system according to an exemplary embodiment of the present invention. The exhaust system illustrates only a schematic configuration that is needed to describe the exemplary embodiment of the present invention, so it is not limited to such a configuration.

Referring to FIG. 1, an exhaust system according to an exemplary embodiment of the present invention includes a first purification device 15, a second purification device 20, and a third purification device 30.

The first purification device 15 is disposed at a rear end portion of exhaust manifold of engine 10 in which exhaust gas G inflows, and includes a Lean NOx Trap (LNT) 18. Here, the engine 10 includes a diesel engine of diesel vehicles as an internal combustion engine supplying lean combustion. The engine 10 may generate power by combusting fuel with air as a constant mixture ratio according to control of controller 50.

Also, the second purification device 20 is disposed at a rear end portion of the first purification device 15, and includes a diesel particulate filter (DPF) 21.

Also, the third purification device 30 is disposed at a rear end portion of the second purification device 20, and includes a selective catalytic reduction (SCR) 32. Here, the SCR catalyst 32 may include passive SCR (pSCR) of SCR catalytic type using ammonia (NH3) being exhausted from the LNT cayalst 18 without urea injection.

Meanwhile, the exhaust system according to an exemplary embodiment of the present invention may further include a first lambda sensor 42, a second lambda sensor 44 and a third lambda sensor 46. Further, the exhaust system may further include a controller 50 synchronizing the first lambda sensor 42, the second lambda sensor 44 or the third lambda sensor 46, and controlling regeneration of the LNT catalyst 18.

The first lambda sensor 42 may be disposed between a rear end portion of the exhaust manifold and the first purification device 15, the second lambda sensor 44 may be disposed between a first purification device 15 and the second purification device 20, and the third lambda sensor 46 may be disposed at a rear end portion of the second purification device 20.

The first lambda sensor 42 to the third lambda sensor 46 are engaged to front-end of the LNT catalyst 18 and front-end/rear end portion of the DPF 21 to supply information whether the engine 10 is operating in a lean condition or rich condition.

The controller 50 detects driving information including intaken air amount, engine speed, vehicle speed, and shift speed etc. to control engine driving at a standard driving condition. Also, the controller 50 synchronizes the first lambda sensor 42 to the third lambda sensor 46, and controls regeneration of the LNT catalyst 18.

Meanwhile, distance between exit of the first purification device 15 and entrance of the second purification device 20 is 550 mm to 600 mm. This is for obtaining temperature of the DPF 21.

Also, amount of platinum (Pt) in the LNT catalyst coated on the DPF 21 of the second purification device 20 may be 1.1 to 1.5 times higher than that of the LNT catalyst of the first purification device 15, and the DPF 21 of the second purification device 20 may have porosity equal to or greater than 55%. Also, coating amount of the LNT catalyst and the SCR catalyst of the DPF 21 of the second purification device 20 may be 100 g/L to 200 g/L.

Figure 2:
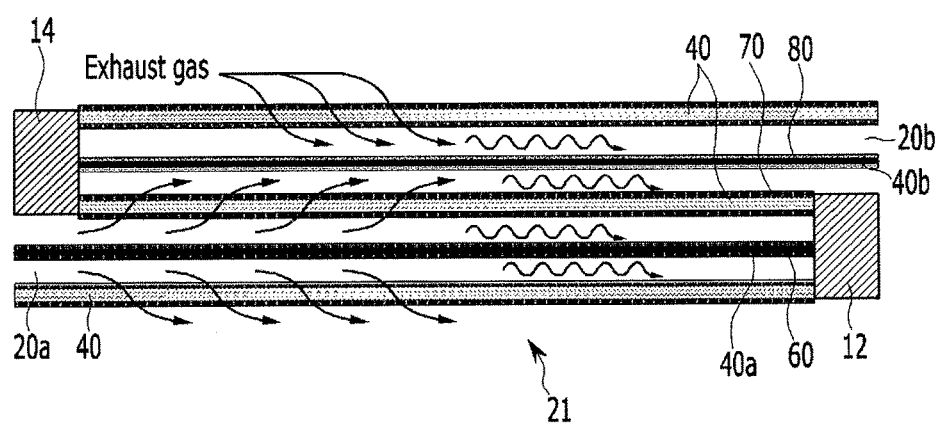
FIG. 2 is a cross-sectional view illustrating a filter of a particulate matter filter.
Figure 3:
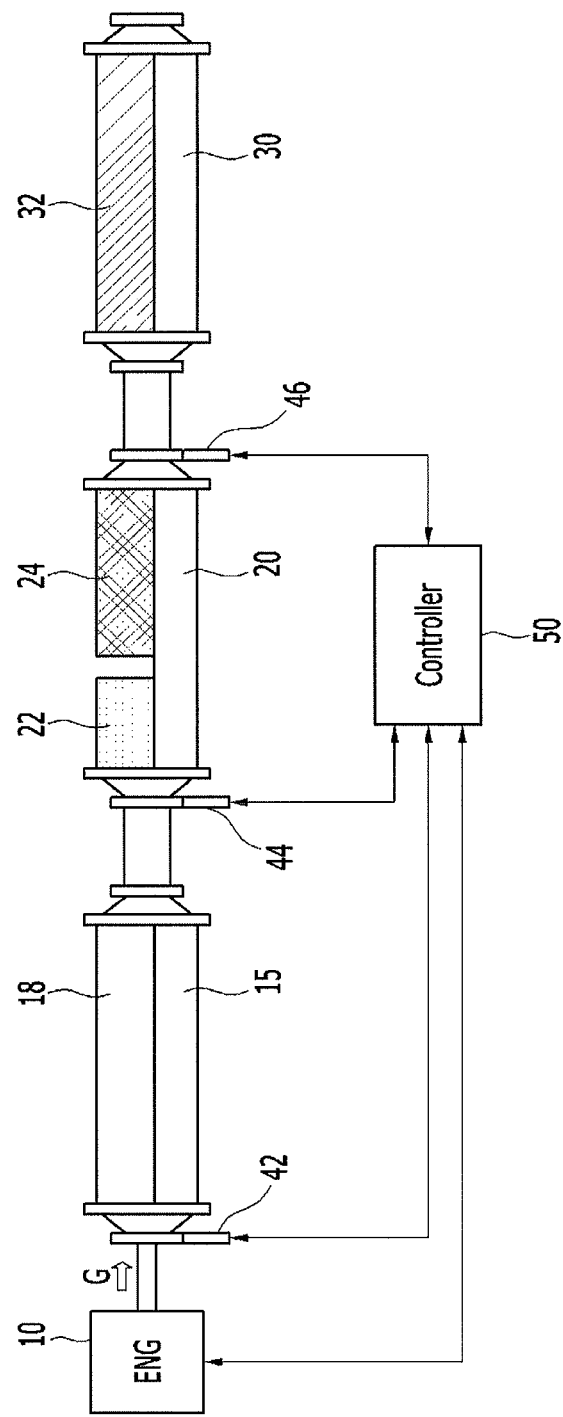
FIG. 3 is a front view illustrating a partial inflow channel and outflow channel of a filter for a diesel particulate filter according to an exemplary embodiment of the present invention.

FIG. 2 is a cross-sectional view illustrating a filter of a particulate matter filter, and FIG. 3 is a front view illustrating a partial inflow channel and outflow channel of a filter for a diesel particulate filter according to an exemplary embodiment of the present invention.

Referring to FIG. 2 and FIG. 3, the DPF 21 of the second purification device 20 includes at least one inflow channel 20a and at least one outflow channel in a housing. A plurality of inflow channel 20a and outflow channel 20b are divided with a wall 40. Also, supports 40a and 40b may be disposed in at least one inflow channel 20a and at least one outflow channel 20b.

Referring to FIG. 2 and FIG. 3, the outflow channel 20b formed at a one end portion of the DPF 21 extends along exhaust gas flow, and may be disposed parallel with the inflow channel 20a. At least one inflow channel 20a is located around the outflow channel 20b. Front-end of the outflow channel 20b is blocked by a plug 14 so that exhaust gas may not inflow into the particulate matter filter through the outflow channel 20b. Rear end portion of the outflow channel 20b is open so that exhaust gas in the DPF 21 outflows from the DPF 21 through the outflow channel 20b.

The wall 40 is disposed between the inflow channel 20a and the outflow channel 20b to define boundary. The wall 40 may be a porous wall in which at least one micropore is formed. The porous wall 40 connects the adjacent inflow channel 20a with the outflow channel 20b hydrodynamically. Accordingly, exhaust gas inflowed through the inflow channel 20a may move to the outflow channel 20b through the porous wall 40. Also, the porous wall 40 does not pass particulate matter included in exhaust gas. When exhaust gas moves from the inflow channel 20a to the outflow channel 20b through the porous wall 40, particulate matter included in exhaust gas is leached by the porous wall 40. The porous wall 40 may include aluminum titante, codierite, and silicon carbide etc.

The supports 40a and 40b may be disposed in at least one of the inflow channel 20a and the outflow channel 20b. The supports 40a and 40b may be disposed only at the inflow channel 20a or only at the outflow channel 20b. FIG. 2 and FIG. 3 illustrate that the supports 40a and 40b extend parallel with direction that the inflow channel 20a and the outflow channel 20b extend, but it is not limited to the disclosed exemplary embodiments.

In other words, the supports 40a and 40b may vertically or obliquely extend to direction to which the inflow channel 20a and the outflow channel 20b extend. In case the supports 40a and 40b vertically or obliquely extend to direction to which the inflow channel 20a and the outflow channel 20b extend, at least one of both end portions of the supports 40a and 40b may not contact the porous wall 40.

Meanwhile, the supports 40a and 40b are not installed to play a role of a filter but to hold catalyst, so they are not necessarily made of porous material. In other words, the supports 40a and 40b may include same material with or different material from the porous wall. Although the supports 40a and 40b include porous material, pressure difference between channels 20a or 20b divided by the supports 40a and 40b merely exists, therefore exhaust gas merely pass the supports 40a and 40b and moves along the supports 40a and 40b and the wall 40. Also, the supports 40a and 40b need not play a role of a filter, therefore the supports 40a and 40b need not be formed thickly. In other words, thickness of the supports 40a and 40b may be formed thinner than the wall 40, and this minimizes back pressure increase.

On one of the inner wall of the inflow channel, the inner wall of the outflow channel, or the support, at least one of diesel oxidation catalyst (DOC), the LNT catalyst, or the SCR catalyst may be coated. When the supports 40a and 40b include porous material, catalyst 60, 70 and 80 are coated on the surface of the support 40 and micropore of inside of the supports 40a and 40b. Unlike this, when the supports 40a and 40b include non-porous material, catalyst 60, 70 and 80 are coated on the surface of the supports 40a and 40b.

Further, supports 40a and 40b may be divided by a first support 40a disposed inside of the inflow channel 20a and a second support 40b disposed inside of the outflow channel 20b.

Meanwhile, the SCR catalyst may be coated on the inner wall of the inflow channel 20a, and LNT catalyst may be coated on the inner wall of the outflow channel 20b. The SCR catalyst of the second purification device may be ion substituent zeolite catalyst, especially Cu-CHA catalyst, and the SCR catalyst may be coated on the support.

Figure 4:
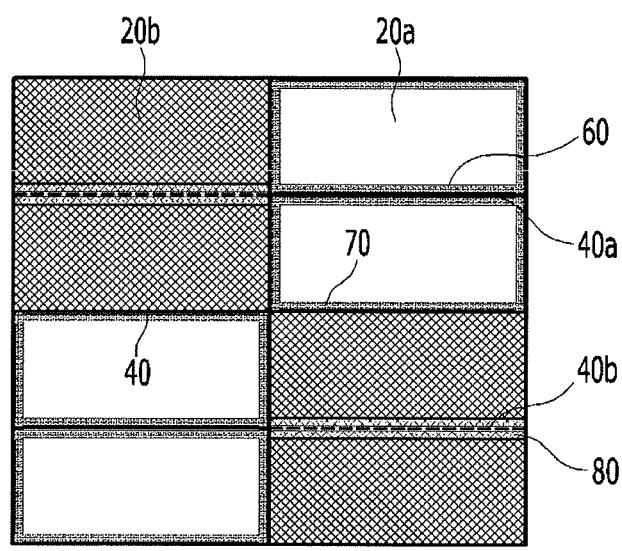
FIG. 4 is a schematic view of an exhaust system according to another exemplary embodiment of the present invention.

FIG. 4 is a schematic view of an exhaust system according to another exemplary embodiment of the present invention.

Referring to FIG. 4, the exhaust system include a first purification device 15 disposed at a rear end portion of exhaust manifold of diesel engine and including a first LNT catalyst 18, a second purification device 20 disposed at a rear end portion of the first purification device 15 and including a second SCR catalyst 22 and a second LNT catalyst 24 disposed at a rear end portion of the second SCR catalyst 22, and a third purification device 30 disposed at a rear end portion of the second purification device 20 and including a first SCR catalyst 32.

The second purification device 20 may include the second SCR catalyst 22 and the second LNT catalyst 24 disposed at a rear end portion of the second SCR catalyst 22. By continuing of rich state, a large quantity of ammonia exists between the first LNT catalyst 18 and the second LNT catalyst 24 during nitrogen oxide reduction, but approximately above 30% of the ammonia is oxidized and eliminated during passing the second LNT catalyst 24. The eliminated ammonia may be utilized by having the second SCR catalyst 22 at the front-end of the second LNT catalyst 24. At this time, the second SCR catalyst 22 of the second purification device 20 may be ion substituent zeolite catalyst, especially Cu-CHA catalyst Also, the third purification device 30 is disposed at the rear end portion of the second purification device 20 and includes a first SCR catalyst 32. Here, the first SCR catalyst 32 may include passive SCR (pSCR) of SCR catalytic type using ammonia (NH3) being exhausted from the LNT cayalst 18 and 24 without urea injection.

The exhaust system according to an exemplary embodiment of the present invention may further include a first lambda sensor 42, a second lambda sensor 44 and a third lambda sensor 46. Further, the exhaust system may further include a controller 50 synchronizing the first lambda sensor 42, the second lambda sensor 44 or the third lambda sensor 46, and controlling regeneration of the first LNT catalyst 18 or the second LNT catalyst 24.

The first lambda sensor 42 may be disposed between a rear end portion of the exhaust manifold and the first purification device 15, the second lambda sensor 44 may be disposed between a first purification device 15 and the second purification device 20, and the third lambda sensor 46 may be disposed at a rear end portion of the second purification device 20.

The first lambda sensor 42 to the third lambda sensor 46 are engaged to front-end of the first LNT catalyst 18 and front-end/rear end portion of the second LNT catalyst 24 to supply information whether the engine 10 is operating in a lean condition or rich condition.

The controller 50 detects driving information including intaken air amount, engine speed, vehicle speed, and shift speed etc. to control engine driving at a standard driving condition. Also, the controller 50 synchronizes the first lambda sensor 42 to the third lambda sensor 46, and controls regeneration of the first LNT catalyst 18 and the second LNT catalyst 24. Here, the controller 50 may control to regenerate the first LNT catalyst 18 and the second LNT catalyst 24 simultaneously or respectively.

Also, the controller 50 measures nitrogen oxide slip value of the first LNT catalyst 18 and nitrogen oxide loading value to the second LNT catalyst 24, and temperature of the second LNT catalyst 24 together with temperature of the first LNT catalyst 18.

At this time, the controller 50 may measure the nitrogen oxide slip value of the first LNT catalyst 18 by using nitrogen oxide loading value to the first LNT catalyst 18, temperature and exhaust gas flow rate etc. Also, the controller 50 may measure the nitrogen oxide loading value to the second LNT catalyst 24 by using the nitrogen oxide slip value of the first LNT catalyst 18, temperature of the second LNT catalyst 24 and inflowing flow rate to the second LNT catalyst 24.

Figure 5A:
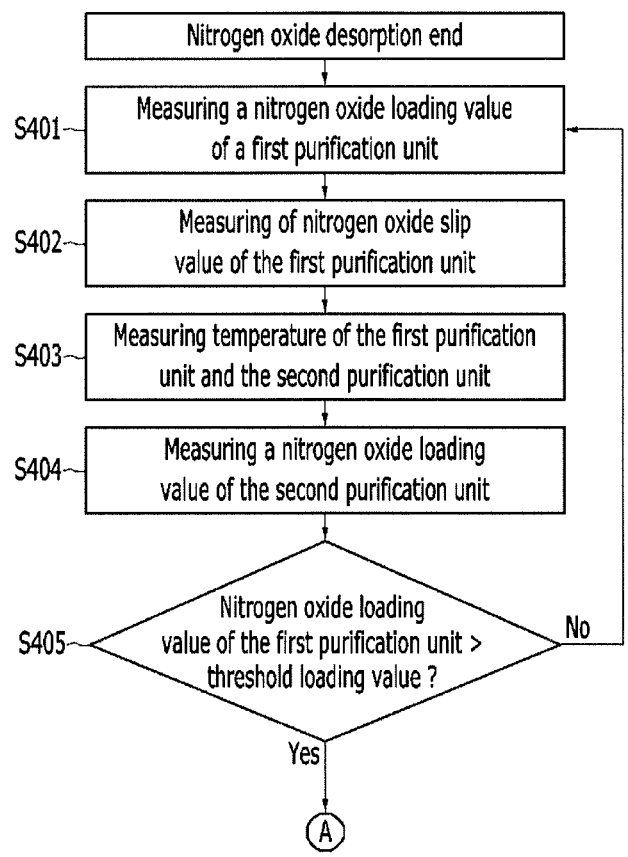

FIG. 5A and FIG. 5B are flowcharts illustrating exhaust gas purifying process in the exhaust system according to an exemplary embodiment of the present invention.

Referring to FIG. 5A and FIG. 5B, a control method of nitrogen oxide desorption according to an exemplary embodiment of the present invention, firstly, a nitrogen oxide loading value of a first purification device is measured after ending of nitrogen oxide desorption S401. Nitrogen oxide slip value of the first purification device is measured of by using nitrogen oxide loading value to the first LNT catalyst, temperature and exhaust gas flow rate etc. S402.

Then, temperature of the first purification device and the second purification device is measured by using a temperature sensor S403. Then, a nitrogen oxide loading value of the second purification device is measured S404.

The nitrogen oxide loading value of the first purification device is compared with a threshold loading value S405, and the temperature of the first purification device is compared with a threshold temperature in case the nitrogen oxide loading value of the first purification device is greater than the threshold loading value S406. Then, the temperature of the second purification device is compared with the threshold temperature in case the temperature of the first purification device is greater than the threshold temperature S407.

Nitrogen oxide from the first purification device and the second purification device is desorbed at the same time in case the temperature of the second purification device is greater than the threshold temperature S408.

Nitrogen oxide is desorbed only from the first purification device in case the temperature of the second purification temperature is not greater than the threshold temperature S409.

Further, the temperature of the second purification device is compared with the threshold temperature in case the temperature of the first purification device is not greater than the threshold temperature S410, and the nitrogen oxide is desorbed only from the second purification device in case the temperature of the second purification device is greater than the threshold temperature S411.

Meanwhile, the desorption of the nitrogen oxide of the first and second purification devices is hold in case the temperature of the second purification device is not greater than the threshold temperature S412.

Like this, according to the exemplary embodiment of the present invention, by the DPF structure having an additional support with conventional wall, catalyst contact time may be increased to increase catalyst response time and increase catalyst coating amount on a filter carrier so that exhaust gas purification performance may be improved.

Also, exhaust gas may not pass through the support, so back pressure increase does not exist, and length of the additional support may be optimized to prevent from catalyst degradation during DPF regeneration.

Also, ammonia disappearing between fore-end LNT catalyst and rear end portion LNT catalyst may be utilized in SCR catalyst by the structure of DPF structure simultaneously having functions of SCR catalyst and LNT catalyst, or by the structure the SCR catalyst and the LNT catalyst are sequentially disposed.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An exhaust system comprising:
    a first purification device disposed at a rear end portion of exhaust manifold of diesel engine and including a Lean NOx Trap (LNT);
    a second purification device disposed at a rear end portion of the first purification device and including a diesel particulate filter (DPF); and
    a third purification device disposed at a rear end portion of the second purification device and including a selective catalytic reduction (SCR),
    wherein the DPF of the second purification device includes at least one inflow channel in which fluid inflows, at least one outflow channel from which fluid outflows, at least one wall disposed between the at least one inflow channel and the at least one outflow channel and extended in a longitudinal direction, and a support disposed inside of at least one of the at least one inflow channel and the at least one outflow channel, and at least one catalyst is coated on one of an inner wall of the inflow channel, an inner wall of the at least one outflow channel, or the support,
    wherein an SCR catalyst is coated on the inner wall of the inflow channel in the DPF of the second purification device, and
    wherein an LNT catalyst is coated on the inner wall of the at least one outflow channel in the DPF of the second purification device.

2. The system of claim 1, wherein the SCR catalyst of the second purification device is ion substituent zeolite catalyst, especially Cu-CHA catalyst.

3. The system of claim 2, wherein the SCR catalyst is coated on the support.

4. The system of claim 3, wherein amount of platinum (Pt) in the LNT catalyst is 1.1 to 1.5 times higher than that of the LNT catalyst of the first purification device.

5. The system of claim 1, wherein the DPF of the second purification device has porosity equal to or greater than 55%.

6. The system of claim 1, wherein coating amount of the LNT catalyst and the SCR catalyst of the DPF of the second purification device is 100 g/L, to 200 g/L.

7. The system of claim 1, wherein distance between exit of the first purification device and entrance of the second purification device is 550 mm to 600 mm.

8. The system of claim 1, further including:
    a first lambda sensor disposed between the rear end portion of the exhaust manifold and the first purification device;
    a second lambda sensor disposed between a first purification device and the second purification device; and
    a third lambda sensor disposed at a rear end portion of the second purification device.

9. The system of claim 8, further including:
    a controller synchronizing the first lambda sensor, the second lambda sensor, or the third lambda sensor and controlling regeneration of the LNT catalyst.

* * * * *